Figure 1:
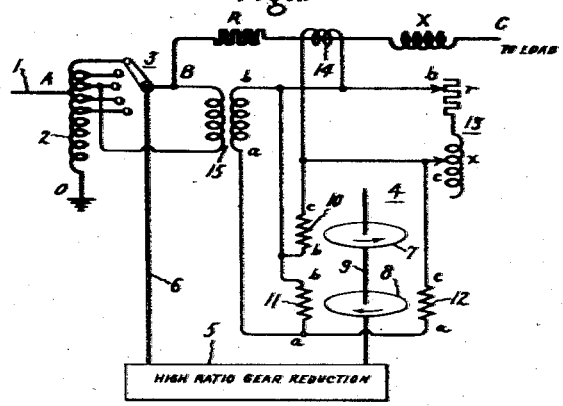

Aug. 26, 1941.    L. F. BLUME ET AL    2,253,947

REGULATOR SYSTEM

Filed April 19, 1938

Inventors:
Louis F. Blume,
Severn D Sprong,
by Harry E. Dunham
Their Attorney.

Patented Aug. 26, 1941

2,253,947

UNITED STATES PATENT OFFICE 2,253,947

REGULATOR SYSTEM

Louis F. Blume, Pittsfield, Mass., and Severn D. Sprong, Brooklyn, N. Y., assignors to General Electric Company, a corporation of New York Application April 19, 1938, Serial No. 202,892

18 Claims. (Cl. 171—119)

This invention relates to improvements in regulator systems and more particularly to improvements in voltage regulating systems for electric power transmission and distribution systems.

Voltage on alternating current power and light systems is usually maintained constant through the use of induction regulators, transformer tap changing devices and by generator field control, all being actuated by means of instruments responsive to circuit voltage. On a distribution system, several such voltage responsive devices may be installed to maintain voltage constant at several points of the circuit. In such cases it has become standard practice to provide time delays of appropriate values in the operation of the individual regulating devices. For example, the tap changing equipments at or near the load end of the line are provided with considerable more time delay than the larger equipments nearer the source end of the line. This is done in order to prevent hunting between the several equipments.

There are several objections to this method of control. First, although hunting between equipments is prevented, it does not follow that all unnecessary tap changing operations are avoided for there are often load changes which require a tap change of the equipment near the load, rather than a tap change of the larger equipment nearer the generating station. On account of the time delay, however, three tap changes may take place instead of one, consisting of two unnecessary changes of the larger equipment, in addition to the one tap change of the smaller equipment. Furthermore, the appreciable time delay provided for the smaller equipments nearer the load, reduces somewhat their effectiveness in maintaining voltage constant.

In accordance with this invention the above objections are avoided by making the tap changing equipment responsive to line drop instead of circuit voltage and by assigning to each equipment a specific amount of line on the line drop of which it is to function. In this manner, each equipment operates when the line drop to which it is apportioned is of sufficient value to justify voltage correction. This arrangement also eliminates the need of time delay to prevent hunting.

An object of the invention is to provide a new and improved regulator system.

Another object of the invention is to provide a new and improved regulator control device which responds substantially solely to the change in value of a regulated quantity caused by power flow as distinguished from response directly to the quantity itself.

An additional object of the invention is to provide a new and improved voltage regulating system for electric power transmission and distribution systems.

The invention will be better understood from the following description taken in connection with the accompanying drawing and its scope will be pointed out in the appended claims.

Figure 2:
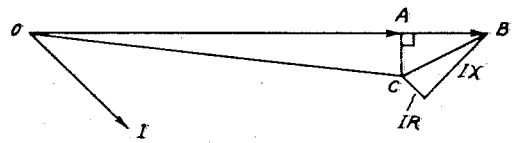
Figure 3:
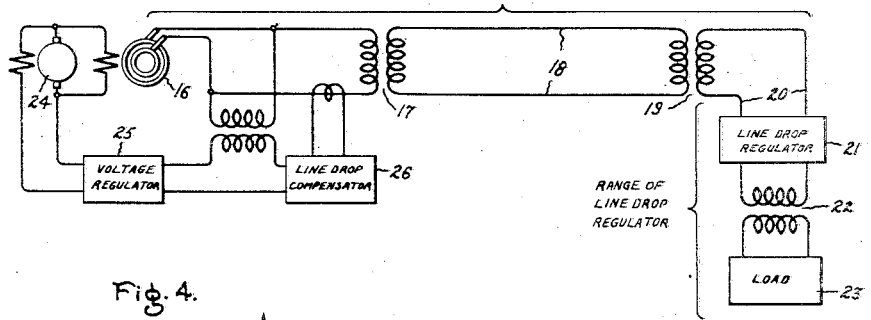
Figure 4:
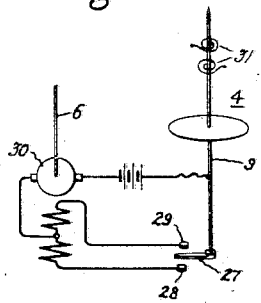

In the drawing, Fig. 1 is a diagrammatic illustration of a regulator unit for use with the present invention, Fig. 2 is a vector diagram for explaining the operation of Fig. 1, Fig. 3 is a diagrammatic illustration of an electric power transmission and distribution system whose voltage is regulated in accordance with the present invention and Fig. 4 is a modified form of control device.

Referring now to the drawing and more particularly to Fig. 1, there is shown therein a conductor 1 representing one phase of an alternating current power transmission and distribution system. For regulating the voltage of this conductor there is provided an autotransformer 2 provided with tap changing mechanism 3 for inserting various amounts of series bucking or boosting regulator voltage in the conductor 1. Tap changing mechanism 3 is operated directly by a novel line drop responsive control device 4 through a suitable high ratio gear reduction 5 and a shaft 6.

Control device 4 consists of an induction disk polyphase wattmeter type rotor having a pair of induction disks 7 and 8 mounted on a common shaft 9. Disk 7 is arranged to be actuated on the well known Ferraris principle, by a line drop responsive winding 10. Disk 8 is arranged to be actuated in the opposite direction by means of a pair of cumulatively acting windings 11 and 12 responsive respectively to the regulator voltage and to the difference between the line drop and the regulator voltage.

As the line drop and the regulator voltage will ordinarily be too high for direct application to the coils of the control device and as it is desirable electrically to insulate the control device from the power circuit, these quantities are proportionately stepped down in value. The reduced line drop is secured by means of a device 13 similar in principle to a conventional resistance and reactance type line drop compensator through which a current proportional to the main line current is circulated by means of a transformer 14. Thus, by adjusting the resistance $r$ and the reactance $x$ of the compensator so that they are proportional respectively to the resistance $R$ and the reactance $X$ of the line conductor 1, the voltage drop in the compensator will be proportional to the voltage drop in the main conductor. The reduced regulator voltage is secured by means of a potential transformer 15 whose primary winding is connected between the points A and B so that it measures the voltage inserted by the tap changing regulating transformer in the circuit.

The operation of Fig. 1 is as follows: As is well known, the torque produced by each of the windings 10, 11 and 12 on the rotor is proportional to the square of the respective voltages applied to these windings. Furthermore, the relative directions of these torques is such that they are balanced and the rotor is at rest only when the torque produced by winding 10 is equal to the sum of the torques produced by windings 11 and 12. From this it follows that the rotor will only be at rest when the square of the voltage applied to the winding 10 is equal to the sum of the squares of the voltages applied to the windings 11 and 12. In terms of the voltages between the points lettered on the drawing, this relation may, therefore, be expressed by the equation $$(ab)^2 + (ac)^2 = (bc)^2$$

The geometrical or vector significance of this equation is that these three voltages must form a right triangle in which the right angle is at $a$ and is between the voltages $ab$ and $ac$. As (1) the voltage $ab$ is proportional to the regulator voltage AB, (2) the voltage $bc$ is proportional to the line drop BC and (3) the voltage $ac$ is proportional to the vector sum of the regulator voltage AB and the line drop BC, the right triangle relationship will also exist between the voltages AB, BC and AC. This is shown in Fig. 2. As the regulator voltage AB is in phase with the system voltage OA on the input side of the regulator, the voltage AC will be at right angles to the voltage OA and, consequently, voltage OA and voltage OC, the load voltage, will be substantially equal.

Thus, whenever a change in load occurs on the main circuit 1, the torque balance of the device 4 is upset and this device will turn in one direction or the other and by suitably arranging the driving connections of the regulator, the control device may be made to operate the regulator to raise the voltage upon increasing load and to decrease the voltage upon decreasing the load. As soon as the load becomes steady again the control device 4 will shortly thereafter arrive at a balance and will come to rest when the voltage conditions are such as to re-establish the right triangle relationship of the three voltages AB, BC and AC. Furthermore, this operation is independent of changes in load power factor in the sense that the right triangle relationship is maintained when the power factor varies, whether or not the power factor variation is accompanied by load variation, as well as when load variations occur at constant power factor.

While the control device for Fig. 1 is shown operating a tap changing regulator, it will, of course, be obvious to those skilled in the art that it may be used to operate any other well-known form of regulator such, for example, as an induction regulator or a rheostatic type regulator.

It will be seen that changes in circuit voltage level will not directly affect the control device 4 because such changes will merely have the effect of increasing and decreasing the size of the vector diagram shown in Fig. 2, without changing the angular relationship of the voltages. Another feature of this arrangement is that the regulator is driven at variable rates of speed, the increase in speed being approximately proportional to the degree of departure of load voltage from normal.

In Fig. 3, there is shown diagrammatically a power system consisting of an alternating current generator 16 connected to a step-up power transformer 17 feeding a transmission line 18 which is connected to a step-down transformer 19 connected to a distribution feeder or primary network 20. In the distribution feeder 20 is a line drop regulator 21 such, for example, as that shown in Fig. 1 and fed through this line drop regulator is a distribution transformer 22 connected to a load or secondary network 23. Generator 16 is provided with a conventional direct current exciter 24 which is regulated by a conventional generator voltage regulator 25. The generator voltage regulator has associated therewith a conventional line drop compensator 26.

The generator voltage regulator 25 and its associated line drop compensator 26 are adjusted so as to maintain constant voltage on the input side of the line drop regulator 21 under all normal conditions of operation of the system. The line drop regulator 21 is adjusted to compensate only for the voltage drop between it and the load 23. In this manner, constant load voltage will be maintained under all conditions of operation and it is unnecessary to provide the line drop regulator with time delay for preventing hunting because this regulator does not respond to voltage and, thus, does not attempt to make correction for voltage dips occurring on the system before the line drop compensated generator voltage regulator has time to make correction.

It should of course be understood that with a long distribution feeder it may be desirable to provide two or more line drop regulators at spaced intervals and assign to each the portion of the feeder between it and the next regulator. It should also be understood that feeder 20 need not be the only one fed by transformer 19 and that in many cases transformer 19 will be at a substation from which extend many feeders or network conductors each of which will contain one or more line drop regulators.

In the modification shown in Fig. 4, the control device 4 is arranged for indirect instead of direct operation of the regulator. Thus, the shaft 9 is provided with a movable contact 27 for cooperation with raise and lower contacts 28 and 29 which control respectively the direction of operation of a separate regulator operating motor 30. With this arrangement it is necessary to provide the device 4 with a neutral return spring 31 so that when the right triangle relationship of the voltages is obtained and the net torque of the device falls to zero, it will be returned automatically to its non-contact making mid position.

The arrangement of Fig. 4 is useful in large regulators where the torque of the device 4 would not ordinarily be sufficient to provide operation or, at least, would not provide fast enough operation. It, however, has the disadvantage in relation to Fig. 1 that contacts are necessary and, in addition, sometimes auxiliary relays between these contacts and the motor will be necessary.

While there have been shown and described particular embodiments of this invention, it will be obvious to those skilled in the art that various changes and modifications can be made therein without departing from the invention, and, therefore, it is aimed in the appended claims to cover all such changes and modifications as fall within the true spirit and scope of the invention.

What we claim as new and desire to secure by Letters Patent of the United States, is:

1. In combination, an electric circuit, means for regulating the voltage of said circuit, and control means for said regulating means, said control means comprising a pair of opposed normally balanced electromagnetic operating elements having windings arranged to produce operating effects on their respective elements which are proportional to the squares of the respective voltages applied thereto, one element having a winding energized in accordance with the voltage drop in said circuit for a given distance from said regulator, the other operating element having a pair of cumulatively acting windings energized respectively in accordance with the voltage of said regulating means and the difference between said voltage drop and the voltage of said regulating means.

2. In an electric power system constituting an electric generator and an electric load interconnected by a transmission and distribution circuit, voltage regulating means therefor comprising, in combination, voltage responsive voltage regulating means for automatically maintaining constant voltage at a point on said power system other than at the load, additional voltage regulating means for correcting for the effect of variations in the phase of the voltage drop in said system between said point and said load, and control means whose controlling effect is substantially independent of changes in system voltage for controlling said additional regulating means in response to changes in phase of said voltage drop.

3. An electric power circuit for transmitting variable amounts of electric power at variable power factors, a pair of spaced points on said circuit, and means including an automatic voltage regulator for holding substantial equality between the voltages at said points as the magnitude and power factor of the power flow through said circuit varies, said means being responsive to variations in magnitude and phase of the circuit current and being substantially independent of changes in the voltage level of said circuit.

4. An electric power circuit for transmitting variable amounts of electric power, a pair of spaced points on said circuit, means for maintaining the voltage at one of said points substantially constant, and means for holding substantial equality between the voltages at said points as the power factor of the power flow through said circuit varies, said last mentioned means being responsive to the effect of variations in the phase of the circuit current and being substantially independent of changes in the voltage level of said circuit.

5. An electric power circuit for transmitting variable amounts of electric power, a pair of spaced points on said circuit, means for maintaining substantially constant voltage at the first of said points measured in the direction of power flow through said circuit, and means for holding substantial equality between the voltages at said points as the power factor of the power flow through said circuit varies, said last mentioned means being responsive to the effect of variations in the phase of the circuit current and being substantially independent of changes in the voltage level of said circuit.

6. An electric power circuit for transmitting variable amounts of electric power at variable power factors, a pair of spaced points on said circuit, a voltage regulator connected in said circuit between said points, and means for controlling said regulator so as to hold substantial equality between the voltages at said points as the magnitude and power factor of the power flow through said circuit varies, said means being responsive to variations in magnitude and phase of the circuit current and being substantially independent of changes in the voltage level of said circuit.

7. An electric power circuit for transmitting variable amounts of electric power at variable power factors, a pair of spaced points on said circuit, a variable ratio transformer type voltage regulator connected in said circuit between said points, and means for controlling said regulator so as to hold substantial equality between the voltages at said points as the magnitude and power factor of the power flow through said circuit varies, said means being responsive to variations in magnitude and phase of the circuit current and being substantially independent of changes in the voltage level of said circuit.

8. An electric power circuit for transmitting variable amounts of electric power, a pair of spaced points on said circuit, a tap changing transformer type voltage regulator connected in said circuit between said points, and means for controlling said regulator so as to hold substantial equality of magnitude between the voltages at said points as the power factor of the power flow through said circuit varies, said means being responsive to variations in the phase of the circuit current and being substantially independent of changes in the voltage level of said circuit.

9. An electric power circuit for transmitting variable amounts of electric power at variable power factors, a pair of spaced points on said circuit, means for maintaining the voltage at one of said points substantially constant, a voltage regulator connected in said circuit between said points, and means for controlling said regulator so as to hold substantial equality between the voltages at said points as the magnitude and power factor of the power flow through said circuit varies, said means being responsive to variations in magnitude and phase of the circuit current and being substantially independent of changes in the voltage level of said circuit.

10. An electric power circuit for transmitting variable amounts of electric power at variable power factors, a pair of spaced points on said circuit, means for maintaining constant voltage at the first of said points measured in the direction of power flow, a voltage regulator connected in said circuit between said points, and means for controlling said regulator so as to hold substantial equality between the voltages at said points as the magnitude and power factor of the power flow through said circuit varies, said means being responsive to variations in magnitude and phase of the circuit current and being substantially independent of changes in the voltage level of said circuit.

11. An electric power circuit for transmitting variable amounts of electric power, a pair of spaced points on said circuit, and rotatable means for holding substantial equality between the voltages at said points as the power flow through said circuit varies, said means being responsive to circuit current and being substantially independent of changes in the voltage level of said circuit, said means rotating at a speed which is approximately proportional to any momentary differences in voltage existing between said points.

12. An electric power circuit for transmitting variable amounts of electric power, a pair of spaced points on said circuit, a voltage regulator connected in said circuit between said points, an electroresponsive motor means for directly driving said regulator so as to hold substantial equality between the magnitude of the voltages at said points as the power factor of the power flow through said circuit varies, said means being responsive to variations in phase of the circuit current and being substantially independent of changes in the voltage level of said circuit.

13. An electric power circuit for transmitting variable amounts of electric power, a pair of spaced points on said circuit, a voltage regulator connected in said circuit between said points, an electroresponsive motor means for directly driving said regulator so as to hold substantial equality between the magnitude of the voltages at said points as the power factor of the power flow through said circuit varies, said means being responsive to variations in phase of the circuit current and being substantially independent of changes in the voltage level of said circuit, said means acting at a speed which is approximately proportional to any momentary differences in the magnitudes of the voltages existing at said points.

14. In a regulator system, an electric circuit which transmits power from a first point thereon to a second point thereon, the impedance of said circuit between said points multiplied by the power current in said circuit producing a substantial voltage difference between said points, and means for substantially cancelling said voltage difference comprising voltage regulating means inserted in said circuit between said points, said regulating means including a normally balanced control device having opposed operating elements, one of said elements being responsive to the square of said voltage difference and the other of said elements being responsive to the sum of the squares of (a) the voltage of said regulator and (b) the vector difference between said voltage difference and said regulator voltage.

15. In combination, an alternating current power circuit for transmitting variable amounts of power at variable power factor, means for maintaining the magnitude of the voltage at a predetermined point on said circuit substantially constant during normal operating conditions in said circuit, a second point on said circuit, voltage regulating means for inserting in series in said circuit between said points a variable magnitude voltage which is always vectorially in line with the circuit voltage at said predetermined point, said circuit having series resistance and reactance between said points which produce a resultant impedance voltage drop between said points whose magnitude and phase vary respectively in accordance with variations in the magnitude and power factor of the power transmitted by said circuit, and electroresponsive means for varying the magnitude of the series voltage of said regulating means in response to variations in phase and magnitude of said impedance voltage drop in such a manner as to maintain their vector sum in quadrature with the circuit voltage at said predetermined point, said means comprising a movable mechanism actuated electromagnetically in one direction in accordance with the square of the impedance voltage drop and in the opposite direction in accordance with the sum of the squares of the voltage of said regulating means and the voltage difference between said points.

16. In combination, an alternating current power circuit for transmitting variable amounts of power at variable power factor, a predetermined point on said circuit, a second point on said circuit, voltage regulating means for inserting in series in said circuit between said points a variable magnitude voltage which is always vectorially in line with the circuit voltage at said predetermined point, said circuit having series resistance and reactance between said points which produce a resultant impedance voltage drop between said points whose magnitude and phase vary respectively in accordance with variations in the magnitude and power factor of the power transmitted by said circuit, and electroresponsive means for varying the magnitude of the series voltage of said regulating means in response to variations in phase and magnitude of said impedance voltage drop in such a manner as to maintain their vector sum in quadrature with the circuit voltage at said predetermined point, said means comprising a movable mechanism actuated electromagnetically in one direction in accordance with the square of the impedance voltage drop and in the opposite direction in accordance with the sum of the squares of the voltage of said regulating means and the voltage difference between said points.

17. In combination, an alternating current power circuit for transmitting variable amounts of power at variable power factor, means for maintaining the magnitude of the voltage at a predetermined point on said circuit substantially constant during normal operating conditions in said circuit, a second point on said circuit, voltage regulating means for inserting in series in said circuit between said points a variable magnitude voltage which is always vectorially in line with the circuit voltage at said predetermined point, said circuit having series resistance and reactance between said points which produce a resultant impedance voltage drop between said points whose magnitude and phase vary respectively in accordance with variations in the magnitude and power factor of the power transmitted by said circuit, and electro-responsive means for varying the magnitude of the series voltage of said regulating means in response to variations in phase and magnitude of said impedance voltage drop in such a manner as to maintain their vector sum in quadrature with the circuit voltage at said predetermined point.

18. In combination, an alternating current power circuit for transmitting variable amounts of power at variable power factor, a predetermined point on said circuit, a second point on said circuit, voltage regulating means for inserting in series in said circuit between said points a variable magnitude voltage which is always vectorially in line with the circuit voltage at said predetermined point, said circuit having series resistance and reactance between said points which produce a resultant impedance voltage drop between said points whose magnitude and phase vary respectively in accordance with variations in the magnitude and power factor of the power transmitted by said circuit, and electroresponsive means for varying the magnitude of the series voltage of said regulating means in response to variations in phase and magnitude of said impedance voltage drop in such a manner as to maintain their vector sum in quadrature with the circuit voltage at said predetermined point.

LOUIS F. BLUME.
SEVERN D. SPRONG.